(No Model.)

J. A. COREY.
WAGON JACK.

No. 388,341. Patented Aug. 21, 1888.

Witnesses.
Charles M. Arnold
Howard B. Perry

Inventor,
John A. Corey.
By his Attorney John G. Perry.

UNITED STATES PATENT OFFICE.

JOHN A. COREY, OF ROCKVILLE, ASSIGNOR OF ONE-HALF TO CHARLES D. CHASE, OF SHANNOCK, RHODE ISLAND.

WAGON-JACK.

SPECIFICATION forming part of Letters Patent No. 388,341, dated August 21, 1888.

Application filed February 4, 1888. Serial No. 262,982. (No model.)

*To all whom it may concern:*

Be it known that I, JOHN A. COREY, of Rockville, Washington county, Rhode Island, have invented certain new and useful Improvements in Wagon-Jacks, of which the following is a specification, reference being had to the accompanying drawings, making a part of the same, and to the letters of reference marked thereon.

The invention relates to that class of jacks called "carriage" or "wagon" jacks used for the purpose of raising the axles of vehicles when it is desirable to remove the wheels. It is fully illustrated in the accompanying drawings, in which—

Figure 1:
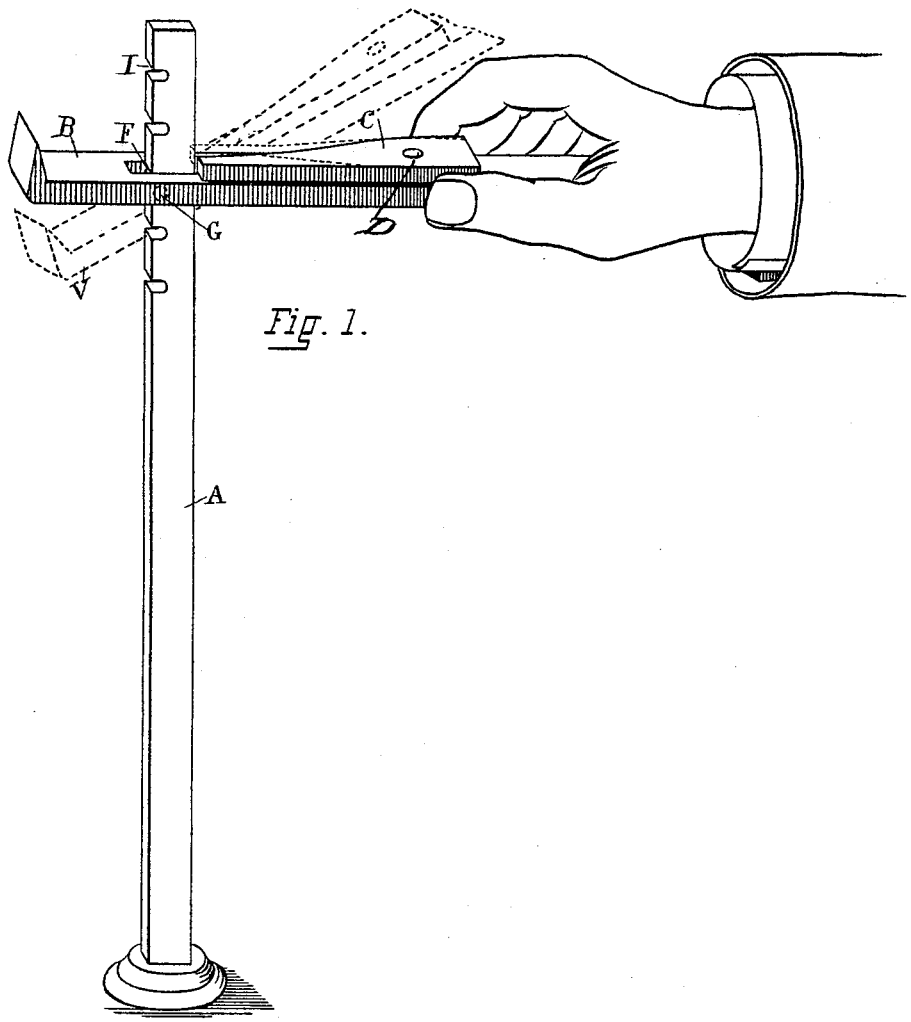
Figure 2:
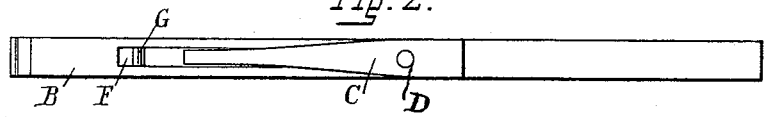

Figure 1 shows a side elevation of the jack in perspective; Fig. 2, a top view of the lever-bar B, with its latch or stop-lever C.

The jack consists of a standard made of an upright bar, A, which may be of wood or metal, provided with a base to give it a firm bearing on the floor or ground. A series of recesses or notches, I, are made through one edge of the bar A at different heights from the base, to accommodate axles at different heights from the ground.

The bar B, Fig. 2, has a mortise, F, made through it at about one-fourth of its length from one end. The width of this mortise is sufficent to receive the upright bar A freely, and of greater width than that bar, so that the pin G, placed across the mortise, does not prevent the bar A from sliding through it freely. The pin G is firmly secured in the bar on each side of the mortise, so as to sustain all the weight on the axle to be raised. A small swinging latch or stop-lever, C, is attached to the top of the bar B by a pivot, D, on which it swings. The short end of the bar B is turned up at the end, so as to keep the axle on it while being raised.

The operation is as follows: The jack, as shown in Fig. 1, is placed upright against the axle to be raised, with its recessed side toward the axle. The bar B (or lever) is pushed toward the axle, so as to bring the standard-bar A into the back part of the mortise and the pin G out of the recess in the bar A, when the lever B will be free to move up or down on the standard. The lever B is then moved up against the under side of the axle, in the position shown in dotted lines V, Fig. 1, and drawn back, so that the pin G will enter one of the recesses I. Then by pressing down on the long end of the lever B the axle will be raised by the short end over the pin in the recess, which serves as a fulcrum. In the meantime the latch C has been held free from the standard-bar A by the pressure of the thumb of the hand that operates the lever B. When the lever B is pushed down level, the thumb is removed from the back end of the latch C, and the pressure of the fingers on the opposite side of the latch will move its front end back of the bar A and prevent that end of the lever B from rising, while the other end will support the axle. To lower the axle these motions are reversed. The long end of the lever B is slightly depressed. The thumb pressed against the back end of the latch C throws its forward end away from the bar A, when the long end of the lever B can be allowed to rise gradually and let the axle down to its original position.

Having thus described my improved jack, what I claim as my invention, and desire to secure by Letters Patent, is—

The standard A, having a series of recesses in its edge, in combination with the lever B, made with the mortise and pin, and the swinging latch C, pivoted to said lever, substantially as and for the purpose set forth.

JOHN A. COREY.

Witnesses:
H. B. PERRY,
JOHN G. PERRY,
CHARLES M. ARNOLD.